United States Patent [19]

Suzuki et al.

[11] Patent Number: 5,016,842
[45] Date of Patent: May 21, 1991

[54] PROTECTOR FOR WIRE HARNESS

[75] Inventors: Katsuya Suzuki, Shizuoka; Yoshihiro Nakajima; Tomoyuki Ishii, both of Kanagawa, all of Japan

[73] Assignees: Yazaki Corporation; Nissan Motor Co., Ltd., Japan

[21] Appl. No.: 400,735

[22] Filed: Aug. 30, 1989

[30] Foreign Application Priority Data

Aug. 30, 1988 [JP] Japan .......................... 63-112869[U]

[51] Int. Cl.$^5$ .............................................. F16L 3/22
[52] U.S. Cl. .................................. 248/68.1; 248/74.1
[58] Field of Search .................... 248/68.1, 74.1, 74.3, 248/74.2, 62; 174/71 R, 72 R; 24/543, 16 PB, 17 AP

[56] References Cited

U.S. PATENT DOCUMENTS

| 4,509,710 | 4/1985 | Cooper | 24/17 AP |
| 4,527,759 | 7/1985 | Dorner | 248/74.2 X |
| 4,623,102 | 11/1986 | Hough | 248/74.3 X |
| 4,795,114 | 1/1989 | Usui | 248/62 |
| 4,899,965 | 2/1990 | Usui | 248/68.1 |
| 4,905,943 | 3/1990 | Sugiyama | 174/72 R |
| 4,909,462 | 3/1990 | Usui | 248/74.1 |

FOREIGN PATENT DOCUMENTS

| 2439350 | 5/1980 | France | 248/74.2 |
| 100636 | 7/1977 | Japan . | |
| 100637 | 7/1977 | Japan . | |
| 50196 | 4/1979 | Japan . | |
| 63-4858 | 1/1986 | Japan . | |
| 142162 | 9/1987 | Japan . | |

Primary Examiner—J. Franklin Foss
Attorney, Agent, or Firm—Wigman & Cohen

[57] ABSTRACT

Disclosed herein is a protector for wire harness, which comprises a first protector body for protectively covering a first wire harness to be secured therein and a second protector body for protectively covering a second wire harness to be optionally secured therein. The second protector body having a substantially L-like shape in cross section. The second body is pivotally coupled with the first protector body through a hinge member so as to enable pivotal movement of the second protector body with respect to the first protector body. The protector further comprises a plurality of supporting pieces for supporting the second wire harness thereon which may be secured in addition to the first wire harness. The supporting pieces are provided on the first protector body so as to secure the second wire harness in cooperation with the second protector body.

7 Claims, 4 Drawing Sheets

PROTECTOR FOR WIRE HARNESS

BACKGROUND OF THE INVENTION

1. Field of the Invention

The present invention relates to a protector for wire harness for covering and protecting wire harness to be arranged on a vehicle floor or the like.

2. Description of the Prior Art

As shown in FIG. 1, conventionally, when a wire harness is arranged along side sills 2 of a body 1 of an automotive, a protector 3 is used in order to restrict the wiring path of the wire harness and to protect it.

The protector 3 is formed of a synthetic resin having a gutter-shape of which cross section is reversely U-shaped. The wire harness 4 is secured within the gutter shape portion of the protector 3 by winding a tape 5 for several times around the wire harness and the protector 3. The protector 3 to which the wire harness 4 is secured is fixed to the side sills 2 of the body 1 of the automotive, as shown in FIG. 2.

The protectors for wire harness of this kind are disclosed in Japanese Laid-open Utility Model Publication Nos. 100636/1977 and 100637/1977, in which a wire protecting tube to be mounted on an inner panel is shown, respectively. Another protector is also disclosed in Japanese Laid-open Utility Model Publication No. 50196/1979, which has a wire supporting body in which a wire harness is secured. This supporting body is mounted on a mounting panel through a hook and an upper open side of the supporting body is covered by a lid after wire harness is secured therein. Yet another protector is disclosed in Japanese Laid-open Utility Model Publication No. 142162/1983, in which wire harness and pipes are arranged on a shelf of an inner panel of a side sill, the upper side of the inner panel is covered by a protector, and a floor carpet is stapled onto the end of the protector.

However, in each of these protectors for the wire harness according to the prior arts, there is problem that only a primary single wire harness is secured and protected thereby. Therefore, any additional wire harness which is also desired to be mounted together cannot be secured and protected by the same protector, once the primary single wire harness has been mounted by the protector on a vehicle.

In order to solve this problem, conventionally another wire harness which is expected to be added was in advance secured together with the primary wire harness, and they were covered by a single protector. Further, a plurality of protectors for different wire harnesses have been preliminarily provided on a vehicle.

It is difficult, however, to preliminarily predict, at the time of mounting the primary wire harness, that another wire harness may become necessary. Accordingly, in the former case, the additional wire harness which may be unnecessary has to be disposed in advance. This results in the disadvantage that the labor cost for the disposing the additional wire harness as well as its material cost are increased. Further, in the latter case, a plurality of the protectors have to be mounted on a vehicle, which also results in increase of the labor cost for mounting the protectors as well as their material costs. In this respect, please note that none of the protectors for wire harness according to the prior arts as described above fails to take problems concerning another wire harness to be added later into their consideration.

SUMMARY OF THE INVENTION

It is therefore an object of the present invention to overcome the above problems and to provide a protector for wire harness in which an additional wire harness to be added later in addition to a primary wire harness can be easily secured and protected together by a single protector.

It is another object of the present invention to provide a protector to which the additional wire harness can be easily mounted.

In order to achieve the above objects, a protector for wire harness according to the present invention comprises a first protector body for protectively covering a first wire harness to be secured therein and a second protector body for protectively covering a second wire harness to be optionally secured therein. The second protector body has a substantially L-like shape in cross section, which is pivotally coupled to the first protector body through a hinge member for enabling pivotal movement of the second protector body with respect to the first protector body. The protector further includes means for supporting the second wire harness thereon, and the supporting means is provided on the first protector body so as to secure the second wire harness in cooperation with the second protector body.

In accordance with the protector as defined above, since the protector has the second protector body which is pivotable with respect to the first protector body, it becomes possible to secure another wire harnesses which may be optionally added later in addition to the primary wire harness already secured in the first protector body by a single protector. This leads to simplifying the wiring operation of wire harnesses when an automotive is assembled and reducing the manufacturing cost thereof.

The first protector body has a side wall having upper and lower sides, and the hinge member is coupled to the upper side of the side wall of the first protector body, and the supporting means comprises a plurality of supporting pieces protrudingly provided on the lower side of the side wall of the first protector body. In this case, each of the supporting pieces may have a substantially L-like shape having a tip portion. Then, the second wire harness can be preliminarily put on the tip portions of the supporting pieces.

Further, a plurality of wire harness holding plates may be provided on a pivotable free end of the second protector body in such a manner that the wire harness holding plates are inserted into spaces between the supporting pieces alternately and in such a manner that the holding plates of the second protector body are inserted below the second wire harness which is supported by the tip portions of the supporting pieces. In accordance with the protector thus constituted, it becomes possible to avoid that the holding plates of the second protector body catch in the wire harness when the second protector body is pivoted to its securing position.

These and other objects, features and advantages of the invention will be better understood from the following description of the invention with reference to the accompanying drawings.

DETAILED DESCRIPTION OF THE PREFERRED EMBODIMENTS

Figure 1:
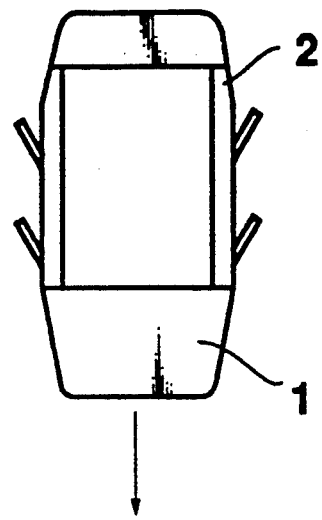
FIG. 1 is a diagram showing the position on which a protector of this, kind is arranged in a body of an automotive.
Figure 2:
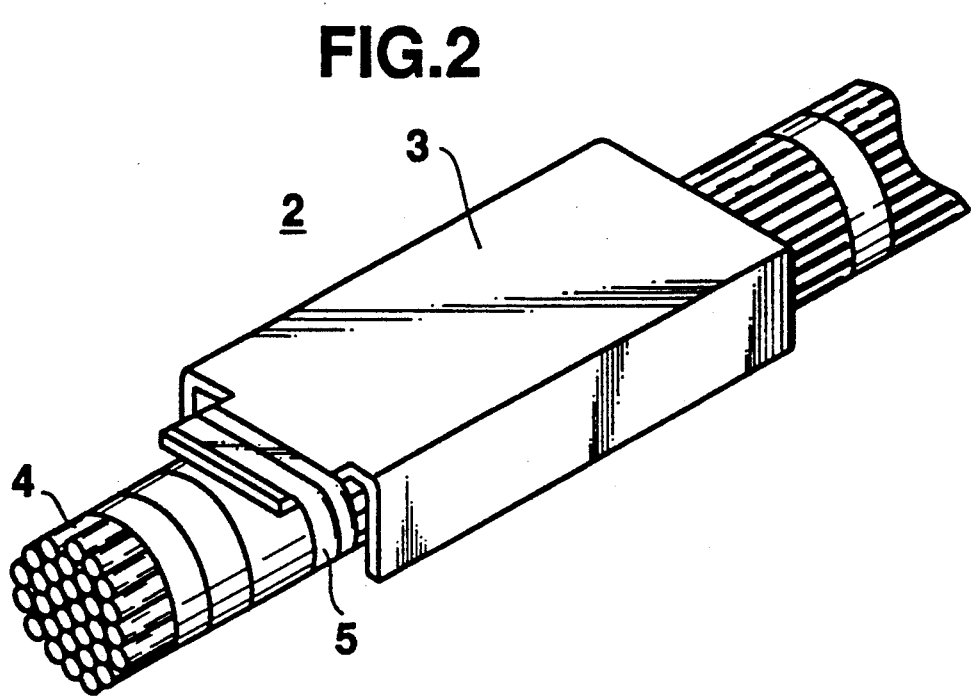
FIG. 2 is a perspective view of a protector for wire harness according to one prior art.

Referring now to the accompanying drawings, the preferred embodiments of the present invention will be described.

FIGS. 3 to 7 illustrate the first embodiment of the protector for wire harness according to the present invention.

In the figures, the reference numeral 3 denotes a first protector body in which a first wire harness 4a (herein after referred to as "primary wire harness") is to be secured and the reference numeral 8 denotes a second protector body in which a second wire harness 4b (herein after referred to as "additional wire harness") is to be secured. The first and second protector bodies 3, 8 are formed of a synthetic resin.

The first protector body 3 is constituted in the form of a gutter having a reversely U-shaped cross section. Therefore, the first protector body has opposite side walls 3a, 3b. As clearly illustrated in FIGS. 3, 4, 6 and 7, a plurality of first wire harness supporting pieces 6, 6 are provided on the lower side of one side wall 3a of the first protector body 3. The plurality of wire harness supporting plates 6, 6 are provided with a predetermined space between adjacent pieces and protruded inwardly, that is toward the other side wall 3b. On these first supporting pieces 6, 6, the primary wire harness is to be placed, so that the primary wire harness 4a is protectively covered by the first protector body 3.

On the lower side of the other side wall 3b of the first protector body 3, there are provided a plurality of second wire harness supporting pieces 7, 7. Each of the second supporting pieces is formed from a substantially L-shaped member integrally formed with the side wall 3b of the first protector body 3. These second supporting pieces 7, 7 are also arranged with a predetermined space between adjacent pieces and protruded toward the same direction as that of the first supporting pieces 6, 6. The tip portions of the L-shaped supporting pieces 7, 7 are directed upwardly as clearly shown in FIG. 4 such that the second wire harness 4a can be preliminarily supported thereon.

On the upper side of the side wall 3a of the first protector body 3, there is provided a L-shaped hook portion 3c which is engageable with a flange portion 12a provided in a side sill 12 to which the protector is fixed.

On the other hand, the second protector body 8 is formed from a substantially L-shaped plate-like member having upper and lower sides. The upper side of the second protector body 8 is integrally and pivotally coupled with the first protector body 3 at the upper side of the other side wall 3a thereof through a hinge member 8a, as clearly shown in FIGS. 3 and 4. Therefore, the second protector body 8 is pivotable with respect to the first protector body 3.

On the lower side of the second protector body 8, that is a pivotal free end portion thereof, there are integrally provided a plurality of wire harness holding plates 9, 9 with a predetermined space between adjacent plates 9. Each of the holding plates 9 comprises a plate-like member which protrudes towards the first protector body 1 in such a manner that the holding plates 9, 9 are inserted into the spaces formed between the second supporting pieces 7, 7 of the first protector body 3 when the second protector body 3 is pivoted toward the direction indicated with the arrow A in FIGS. 3 and 4, that is to say, the holding plates 9 of the second protector body 8 are arranged in such a manner that they are engaged with the second supporting pieces 7, 7 alternately.

On the pivotal free end portion of the second protector body 8, there are also provided two tabs 10, 10 each having a hole 10a into which a clamp 11 is inserted.

In use of the protector as described above, the primary wire harness 4a is first accommodated in the first protector body 3 by placing it on the first wire support pieces 6,6, and then this wire harness 4a is secured to the end of the first protector body 3 with a tape 5. Thereafter, the first protector body 3 is fixed to the flange portion 12a of the side sill 12 by the engagement of the hook portion 3c of the first protector body 3 and the flange portion 12a.

Figure 3:
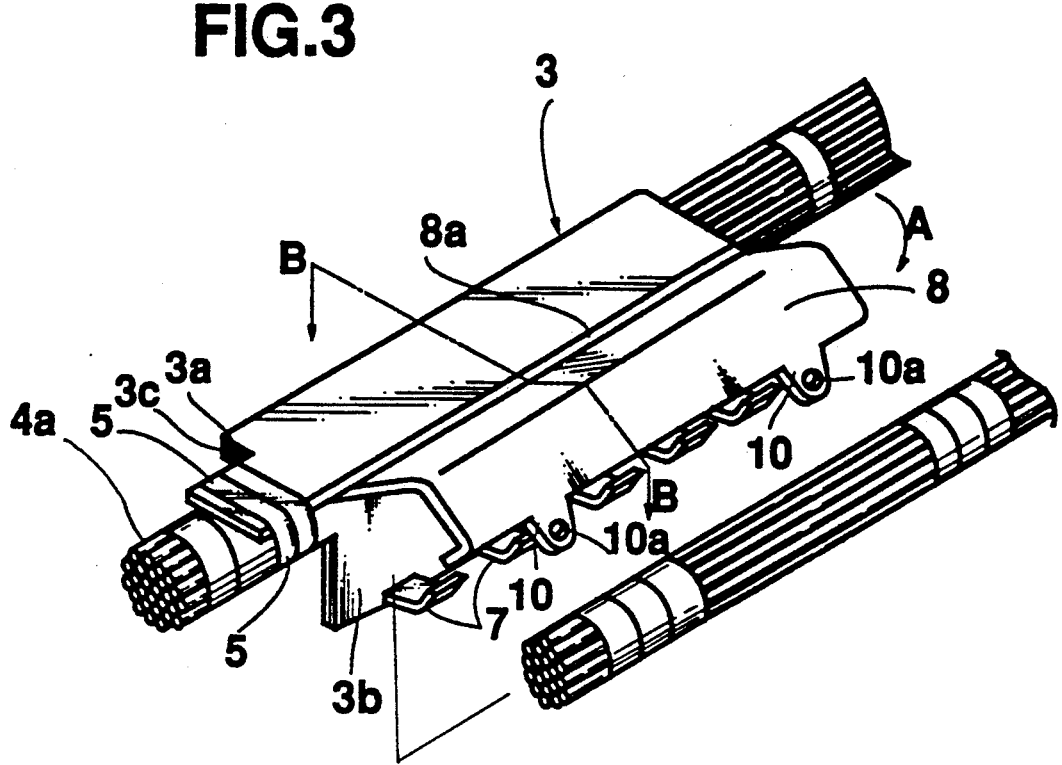
FIG. 3 is a perspective view of a first embodiment of a protector for wire harness according to the present invention.
Figure 4:
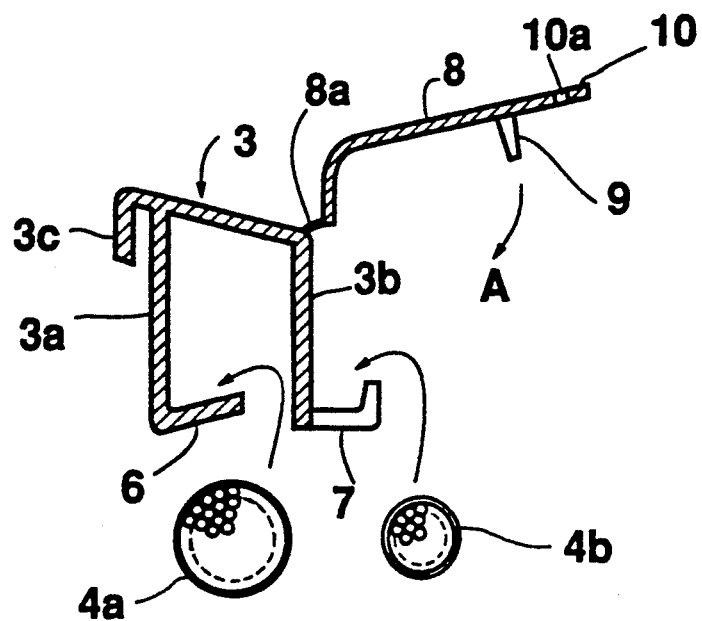
FIG. 4 is a cross sectional view of the protector shown in FIG. 3, which is cut along the B—B line in FIG. 3.
Figure 5:
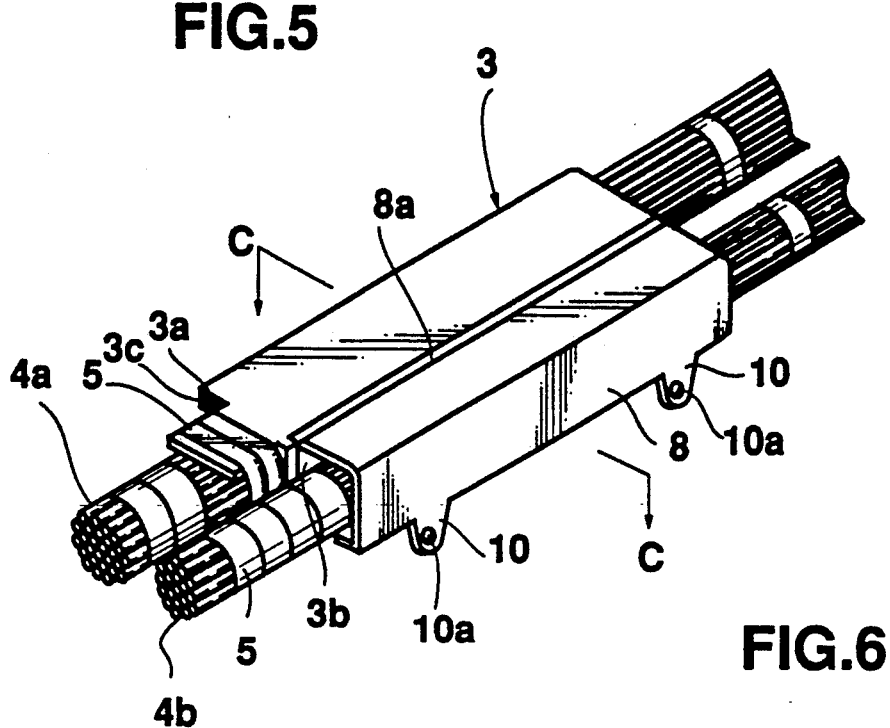
FIG. 5 is a perspective view of the protector of the first embodiment, which shows the condition that both predetermined and additional wire harnesses are secured.
Figure 6:
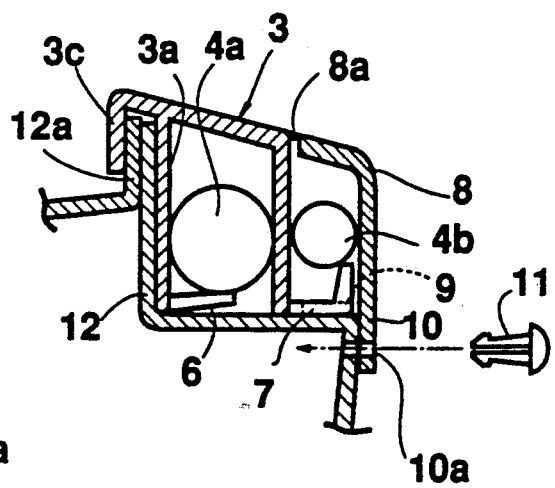
FIG. 6 is a cross sectional view of the protector of the first embodiment, which is cut along the C—C line of FIG. 5.
Figure 7:
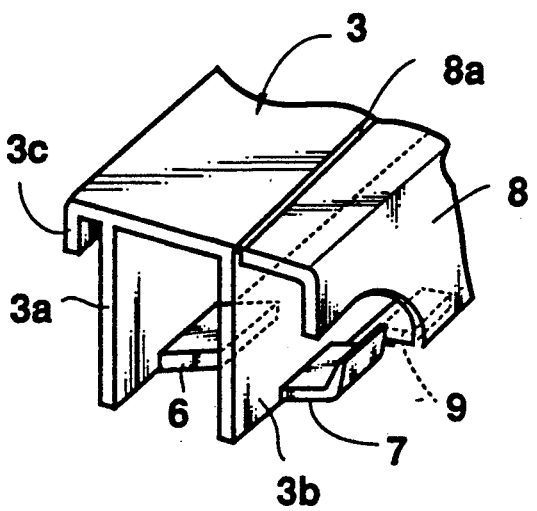
FIG. 7 is a partial cross sectional and perspective view of the protector shown in FIG. 5 without the wire harnesses.

When another wire harness 4b is desired to be secured after the primary wire harness 4a has been mounted, the additional wire harness 4b which has been bundled in one body is placed on the second wire support pieces 7,7 which are protruded toward the outside of the first protector body 3. Then, the second protector 8 is pivotally rotated in the direction of the arrow A by the hinge member 8a so as to cover the additional wire harness 4b by the second protector body 8, as shown in FIGS. 3 and 4. In this condition, since the additional wire harness 4b is lifted by the tip portions of the second wire support pieces 7, 7, the holding plates 9, 9 of the second protector body 8 can be easily inserted below the additional wire harness 4b without catching in the additional wire harness 4b. This condition is clearly shown in FIG. 6. Please note that, in this condition, as stated above, the holding plates 9, 9 are alternately engaged with the second supporting pieces 7, 7.

Furthermore, the second protector body 8 may be locked on the floor of a fixing portion of the side sill 12 by using the clamps 11 which are inserted into the holes 10a of the tabs 10, after the additional wire harness 4b has been secured in the second protector body 8.

According to the embodiment described above, after the primary wire harness 4a has been secured in the first protector body 3, when additional wire harness 4b, such as main wire harness, body wire harness, door wire harness or optional wire harness is desired to be secured, it can be mounted easily to the second protector body 8 which is integrally formed with the first protector body 3, thus realizing the protection of the wire harness 4b and restriction of the wiring path by a single protector. As a result, working process for wiring the additional wire harness 4b as well as manufacturing cost of the protectors can be reduced.

Figure 8:
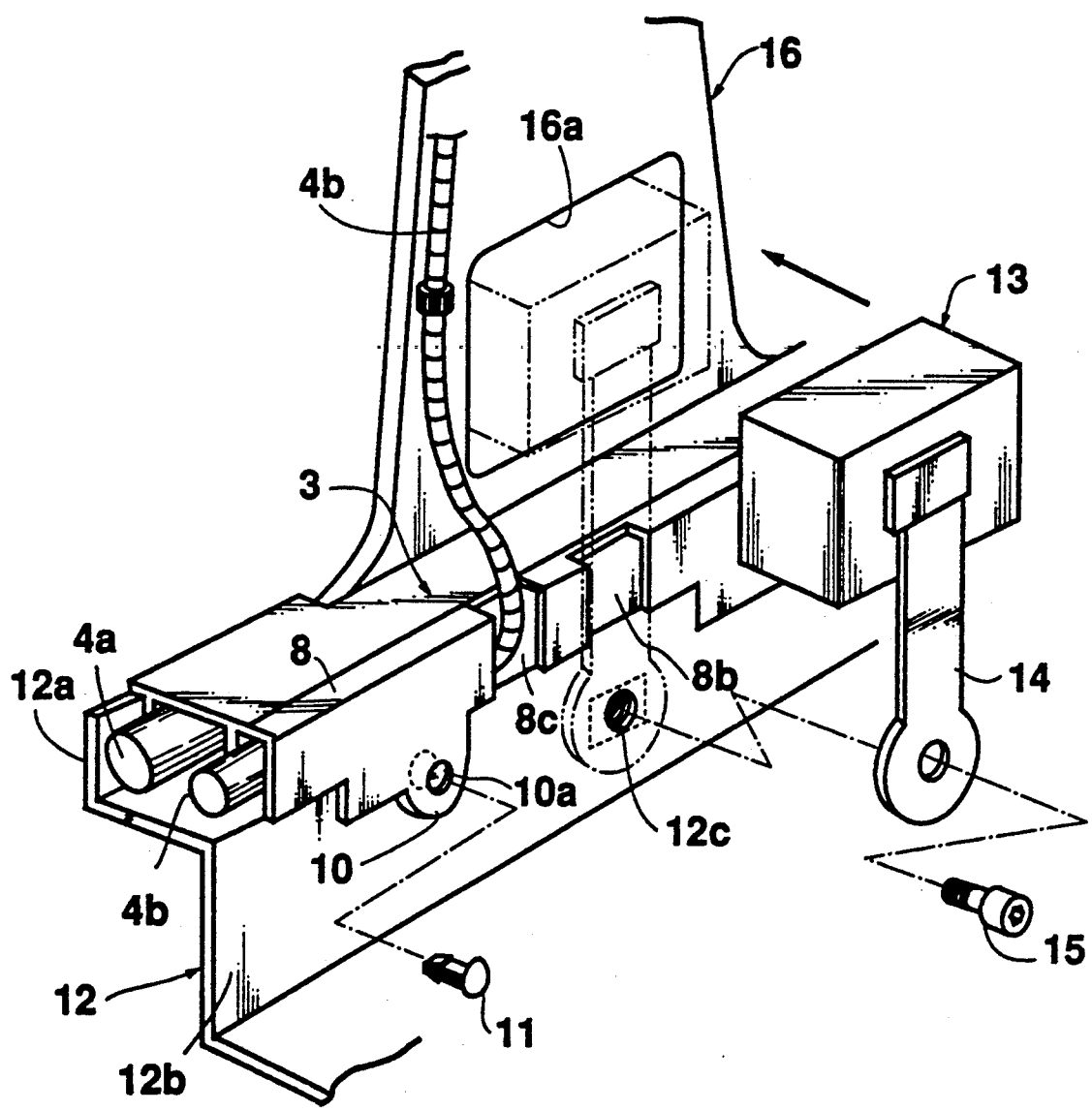
FIG. 8 is a perspective view of a second embodiment of the protector for wire harness according to the present invention.

FIG. 8 shows a second embodiment according to the present invention. In this embodiment, on the side surface 12b of the side sill 12, there is formed normally a mounting hole 12c for mounting a seat belt winding unit 13. Further, a bracket 14 for supporting the seat belt winding unit 13 is secured to the side sill 12 by inserting a bolt 15 into the mounting hole 12c. In addition, a center pillar 16 is fixed by welding to a projection 12a of the side sill 12 in such a manner that the center pillar 16 is protruded upwardly. Moreover, on the center pillar 16, there is also formed a square hole 16a into which the seat belt winding unit 13 is fitted.

A notch portion 8b is formed at the position where the bracket 14 of the second protector body 8 is registered. Accordingly, when the wire harness 4b is covered by the second protector body 8, the bracket 14 is to be fitted to the notch portion 8b. In FIG. 8, the reference numeral 8c indicates another notch portion formed on the second protector body 8 so as to pull out the wire harness 4b along the center pillar 16.

In this embodiment according to the present invention, when the wire harness 4b has been covered by the second protector body 8, the latter is secured to the side sill 12 by inserting the clamp 11 into the hole 10a of the fixing tab 10 as described above. Further, the second protector body 8 is securely positioned and fixed to the side sill 12 by fitting the bracket 14 of the seat belt winding unit 13 to the notch portion 8b when the blacket 14 is fixed to the side sill 12 with the bolt 15, thereby preventing the rotation of the seat belt winding unit 13 as well as achieving the positioning and securing of the unit.

In this embodiment, the description has been made about a protector for covering the wire harnesses 4a, 4b arranged on the floor of a vehicle, it is however apparent that the present invention can easily be applied to other case where the wire harnesses 4a, 4b are arranged in other positions.

In the foregoing embodiments of the protector for wire harness according to the present invention, on the first protector body for protectively covering a primary wire harness there is integrally and pivotally provided a second protector body for protectively covering an additional wire harness. As a result, the protection of different kind wire harness to be added later can be made by a single protector, and regulation of their wiring paths can be easily carried out by it, thereby reducing working process and the cost of the material for protectors.

Although the invention has been described in connection with its preferred embodiments, it is to be understood that the words which have been used are words of description rather than limitation and that various changes and modification may be made within the purview of the appended claims without departing from the true scope and spirit of the invention in its broader aspects.

What is claimed is:

1. A wire harness protector adapted to be mounted on a side sill of a motor vehicle, comprising:
    a first protector body for protectively covering a first wire harness to be secured therein, the first protector body being defined by at least two substantially vertical lateral walls which are arranged substantially in parallel with each other, and a first lateral wall having means for engaging the protector with the side sill, and a second lateral wall having upper and lower sides;
    a second protector body provided adjacent to and in side-by-side relationship with the first protector body at the side of the second lateral wall, for protectively covering a second wire harness which is to be optionally secured therein as the need arises after the first wire harness has been secured in the first protector body, the second protector body having a substantially L-like shape in cross section and having upper and lower sides;
    means for supporting the second wire harness thereon, the supporting means being adapted to secure the second wire harness inside the second protector body in cooperation with the second protector body; and
    a hinge member provided between the upper side of the second lateral wall of the first protector body and the upper side of the second protector body for enabling pivotal movement of the second protector body with respect to the first protector body so as to enable the second protector body to receive the second wire harness inside the second protector body under the condition that the first wire harness has been secured in the first protector body.

2. The protector as claimed in claim 1, wherein the supporting means comprises a plurality of supporting pieces protrudingly provided on the lower side of the second lateral wall of the first protector body.

3. The protector as claimed in claim 2, wherein each of the supporting pieces has a substantially L-like shape having a tip portion, adapted to preliminarily secure the second wire harness on the tip portions of the supporting pieces.

4. The protector as claimed in claim 3, wherein a plurality of wire harness holding plates are provided on the lower side of the second protector body in such a manner that the wire harness holding plates are inserted into spaces between the adjacent supporting pieces alternately when the second protector body is pivoted so as to cover the second wire harness.

5. A protector as claimed in claim 4, wherein the holding plates of the second protector body are adapted to be inserted below the second wire harness which is supported by the tip portions of the supporting pieces.

6. A protector as claimed in claim 5, wherein the protector further comprises means for fixing the second protector body so as not to be pivoted.

7. A protector as claimed in claim 6, wherein the fixing means comprises at least one hole into which a clamp is to be secured, and the hole being provided in a tab formed on the pivotable free end of the second protector body.

* * * * *